United States Patent

Sugihara et al.

[11] Patent Number: 5,384,214
[45] Date of Patent: Jan. 24, 1995

[54] MANUFACTURING OF ZINC-ALKALINE BATTERIES

[75] Inventors: Sachiko Sugihara; Akira Miura, both of Katano; Akira Ohta, Osaka, all of Japan

[73] Assignee: Matsushita Electric Industrial Co., Ltd., Osaka, Japan

[21] Appl. No.: 225,938

[22] Filed: Apr. 11, 1994

Related U.S. Application Data

[63] Continuation of Ser. No. 19,651, Feb. 19, 1993, abandoned.

[30] Foreign Application Priority Data

May 25, 1992 [JP] Japan .................. 4-132171

[51] Int. Cl.⁶ .............................................. H01M 4/02
[52] U.S. Cl. ............................................. 429/206; 429/229
[58] Field of Search ........................... 429/206, 229

[56] References Cited

U.S. PATENT DOCUMENTS

| | | | |
|---|---|---|---|
| 4,735,876 | 4/1988 | Miura et al. | 429/206 |
| 5,128,222 | 7/1992 | Yoshizawa et al. | 429/198 |
| 5,168,018 | 12/1992 | Yoshizawa et al. | 429/190 |

FOREIGN PATENT DOCUMENTS

| | | |
|---|---|---|
| 0427315A2 | 5/1991 | European Pat. Off. . |
| 0510239A1 | 10/1992 | European Pat. Off. . |
| 0032249 | 2/1985 | Japan . |
| 1105466 | 4/1989 | Japan . |
| 3192655A | 8/1991 | Japan . |
| 1122494 | 8/1968 | United Kingdom . |

OTHER PUBLICATIONS

Chemical Abstracts, vol. 116, No. 6, Feb. 10, 1992. Columbus, Ohio, Fujioka, Tokuyuki et al. "Manufacture of Paste-Type Cadmium Anodes for Alkaline Secondary Batteries", p. 156, abstract No. 44 139v & JP Kokai Tokkyo Koho, JP 03-192 655.

*Primary Examiner*—Prince Willis, Jr.
*Assistant Examiner*—M. Nuzzolillo
*Attorney, Agent, or Firm*—Stevens, Davis, Miller & Mosher

[57] ABSTRACT

A non-pollution zinc-alkaline battery excellent in storage stability can be obtained by using, in formulation for negative electrode, a zinc alloy which contains at least one element selected from the group consisting of bismuth, lithium, calcium and aluminum which is free from mercury, lead, cadmium, indium and thallium is used as an active material and yttrium hydroxide or yttrium oxide optimized in a starting material therefor, particle size and weight loss on heat decomposition as an inorganic inhibitor. The storage stability of the battery can be further improved by adding to the above formulation for a negative electrode a proper amount of a surfactant having a polyethylene oxide group in hydrophilic group and a perfluoroalkyl group in oleophilic group as an organic inhibitor.

20 Claims, 1 Drawing Sheet

MANUFACTURING OF ZINC-ALKALINE BATTERIES

This application is a continuation of application Ser. No. 08/019,651, filed Feb. 19, 1993 (abandoned).

BACKGROUND OF THE INVENTION

The present invention relates to a technique to manufacture, without using mercury, lead and indium, zinc-alkaline batteries which use zinc as a negative electrode active material, an aqueous alkali solution as an electrolyte and manganese dioxide, silver oxide, oxygen and the like as a positive electrode active material and provides a method of manufacturing zinc-alkaline batteries which do not cause environmental pollution and are excellent in storage stability and dischargeability.

PRIOR ART

Since about 10 years ago, environmental pollution caused by mercury from waste batteries has become a serious problem and there has been conducted research to reduce the amount of mercury used in alkaline dry batteries. As a result, corrosion-resistant zinc alloys and inhibitors have been developed and at present, the amount of mercury contained in alkaline dry batteries has been reduced to 250 ppm based on the weight of the battery and furthermore, mercury-free alkaline dry batteries have also been put on the market.

Attempt to manufacture alkaline dry batteries without using mercury have been made since mercury-containing alkaline dry batteries were developed and a number of patent applications filed and reports were made directed to corrosion-resistant zinc alloys and inorganic and organic inhibitors. For example, elements such as indium, lead, cadmium and thallium are known as materials having a high hydrogen overvoltage and these elements are used as additive elements for corrosion-resistant zinc alloys and furthermore, compounds (salts, oxides, hydroxides) of these elements are used as inhibitors (Japanese Patent Kokai (Laid-Open) No. 1-105466).

Batteries in which pure zinc is used as a negative electrode active material without mercury suffer from the problems that a vigorous corrosion reaction of the zinc takes place with the generation of hydrogen and the internal pressure of the batteries increases to expel the electrolyte and to deteriorate resistance to leakage of the electrolyte. Further, in the case of partially discharged batteries, the hydrogen generation rate at the zinc negative electrode increases and the resistance to leakage of the electrolyte is further deteriorated. These problems are caused by the fact that mercury, which inhibits the corrosion reaction by enhancing the hydrogen overvoltage of the surface of zinc, has been exhausted. As mentioned above, for in the manufacture at alkaline dry batteries without mercury, indium, lead, cadmium, thallium and the like are used as additive elements for corrosion-resistant zinc alloys and compounds of these elements are used as inhibitors.

Among these lead, cadmium and thallium are pollution causing materials like mercury and it is not desired to use these elements as additive elements even in a slight amount for preventing environmental pollution caused by batteries. Since indium is generally not regarded as harmful and is high in corrosion preventing ability, it is known as an additive to a negative electrode of not only primary batteries, but also secondary batteries. In fact, indium is used in the formulation of mercury-free alkaline batteries not only as an additive element for alloys, but also as an inorganic inhibitor to be added to alkaline electrolytes. However, chronic poisoning of indium has not yet been elucidated and the U.S. Academic Council for Industrial Hygiene (ACGIH) has prescribed the permissible concentration more severely than it does for lead.

The object of the present invention is to provide non-pollution alkaline dry cells by inhibiting corrosion of zinc without using indium, lead, cadmium and thallium as well as mercury.

SUMMARY OF THE INVENTION

First, the present invention will be explained on the use of a corrosion-resistant zinc alloy and an inorganic inhibitor in combination. The zinc negative electrode part in the zinc-alkaline batteries of the present invention comprises a corrosion-resistant zinc alloy powder containing 0.01–0.5 wt. % of bismuth or a corrosion-resistant zinc alloy powder containing 0.01–0.5 wt. % of bismuth and 0.005–0.2 wt. % of one or more of lithium, calcium and aluminum and is used as an active material and an alkaline electrolyte in which an yttrium hydroxide or yttrium oxide powder having proper properties is dispersed at a proper concentration.

Next, the present invention will be explained on the use of a zinc alloy, an inorganic inhibitor and an organic inhibitor in combination. The zinc negative electrode part in the zinc-alkaline batteries of the present invention comprises a corrosion-resistant zinc alloy powder containing 0.01–0.5 wt. % of bismuth or a corrosion-resistant zinc alloy powder containing 0.01–0.5 wt. % of bismuth and 0.005–0.2 wt. % of one or more of lithium, calcium and aluminum and is used as an active material and an alkaline electrolyte in which a proper concentration of yttrium hydroxide or yttrium oxide powder having proper properties is dispersed and which additionally contains a proper amount of a so-called perfluoroalkyl polyethylene oxide surfactant having polyethylene oxide in a hydrophilic group and a perfluoroalkyl group in an oleophilic group as an organic inhibitor.

The perfluoroalkyl polyethylene oxide surfactant is most effective when contained in an amount of 0.001–0.1 wt. % based on the zinc alloy in the alkaline electrolyte.

Furthermore, from the point of a method for manufacture of batteries, the yttrium hydroxide used is preferably one which is synthesized by a neutralization treatment of an aqueous solution of yttrium chloride, yttrium sulfate or yttrium nitrate as a starting material. Use of yttrium chloride as the starting material gives a higher corrosion resistance than use of yttrium sulfate. When yttrium sulfate or yttrium nitrate is used as the starting material, it is preferable to synthesize the yttrium hydroxide by a neutralization treatment of an aqueous solution containing chloride ion.

Furthermore, yttrium hydroxide or oxide preferably comprises powders containing at least 60 wt. %, preferably at least 70 wt. % of particles having a particle size of 0.5–8 $\mu$ based on the total amount of the powders.

Furthermore, yttrium hydroxide is effective since it shows a loss in weight of 8–25 wt. % upon heat decomposition at a temperature of up to 900° C.

The corrosion-resistant zinc alloy, inorganic inhibitor and the organic inhibitor used in the present invention, and combinations and compositions thereof have been found as a result of intensive research made so that each of them can provide the maximum effect of the combination use. The action of each of the materials has not yet been elucidated, but can be considered as follows.

The advantageous effect obtained by each of the additive elements in the alloy, inorganic inhibitor and organic inhibitor is explained below.

Bismuth as an element in the alloy has itself a high hydrogen overvoltage and, when added to zinc, has an action to increase the hydrogen overvoltage on the surface of zinc. When bismuth is uniformly added to the alloy, it is present at all depths of the powders and, therefore, the above-mentioned action is retained even when a fresh surface of zinc appears under discharge. Lithium, calcium and aluminum have an action to spheroidize the zinc particles and reduce the true specific surface area and thus decrease corrosion of the zinc powder per unit weight.

When yttrium hydroxide or yttrium oxide in a powdery form is dispersed in an alkaline electrolyte in coexistence with a zinc alloy, a part of the oxide is dissolved and specifically adsorbed to the surface of the zinc alloy as yttrium ions to increase the hydrogen overvoltage on the surface. The other part of the oxide remains as a solid in the electrolyte and when a fresh surface of zinc alloy appears under discharge, it is specifically adsorbed to the fresh surface to provide the corrosion preventing effect.

When the surfactant coexists with the zinc alloy in a gel-like alkaline electrolyte, it is chemically adsorbed to the surface of the zinc alloy on the principle of metallic soap and forms a hydrophobic monomolecular layer to provide the corrosion preventing effect. Especially, the surfactant having polyethylene oxide group in its hydrophilic group is high in solubility as a micelle in the alkaline electrolyte and when introduced into the electrolyte, it is rapidly transferred and adsorbed to the surface of the zinc alloy to provide a high corrosion preventing effect. Moreover, when the surfactant has a perfluoroalkyl group in its oleophilic group and is adsorbed to the surface of the zinc alloy, since it has a high electric insulation, donation and acceptance of electron in corrosion reaction are effectively hindered and this effect is sustained because of its high alkali resistance.

Next, the effect obtained by the combination use of the zinc alloy and yttrium hydroxide or yttrium oxide will be explained. Yttrium oxide and yttrium hydroxide dissolve in the electrolyte as yttrium ions and are specifically adsorbed to the surface of the zinc alloy to perform its action. Therefore, the adsorption must take place smoothly and uniformly for its proper effect. Since a considerable amount of hydrogen gas is generated over the zinc surface having no corrosion resistance, adsorption of yttrium ions to the surface is hindered and the state of the adsorption becomes non-uniform. However, generation of hydrogen gas is inhibited on the surface of the zinc alloy having a good corrosion resistance and the adsorption is smoothly and uniformly carried out to provide the synergistic effect.

With reference to the effects obtained by the combination use of the zinc alloy, surfactant and yttrium hydroxide or yttrium oxide, it is considered that, as mentioned above, when the zinc alloy and surfactant are present together, generation of hydrogen gas on the surface of the zinc alloy is further inhibited and adsorption of yttrium ions occurs smoothly and uniformly to provide the synergistic effect.

BRIEF DESCRIPTION OF THE DRAWING

In FIG. 1, 1 indicates a positive electrode depolarizing mix, 2 indicates a gel-like negative electrode of the present invention, 3 indicates a separator, 4 indicates a current collector of the gel-like negative electrode, 5 indicates a positive electrode terminal cap, 6 indicates a metallic case, 7 indicates an outer can of the battery, 8 indicates a polyethylene resin sealer for stopping the opening of the case 6, and 9 indicates a bottom plate which serves as a terminal of the negative electrode.

DESCRIPTION OF THE PREFERRED EMBODIMENTS

Figure 1:
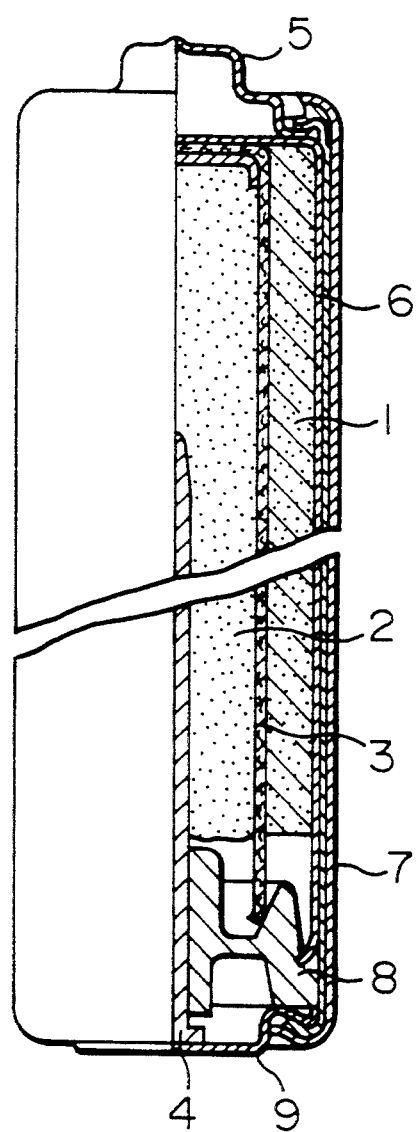
FIG. 1 is a structural cross-sectional view of an alkaline manganese battery LR6 used in the example of the present invention.

The details and effects of the present invention will be explained by the following examples.

First, explanation will be made on a method of preparation of the corrosion-resistant zinc alloy, a method of preparation of the yttrium hydroxide and yttrium oxide and a method for comparative evaluation of the leakage resistance using an LR6 alkaline manganese battery.

The corrosion-resistant zinc alloy powder was prepared by a so-called atomizing method which comprises melting zinc of 99.97% in purity, adding thereto a given additive element in a given amount, uniformly dissolving the element and then powdering the melt by atomization with a compressed air. The resulting powder was classified by a screen to obtain a powder of 45–150 mesh in particle size.

The yttrium hydroxide was prepared in the following manner. A given yttrium salt in a saturation amount was added to an acidic aqueous solution of pH=1 and this aqueous solution was neutralized by adding thereto ammonia gas as a neutralizing agent until the pH of the aqueous solution reached 9 under stirring by a screw stirrer. Thereafter, the precipitate was washed with deionized water on a filter having a mesh of 0.5 $\mu$ until the pH of the filtrate reached 7.5 and the precipitate on the filter was subjected to suction from below the filter under vacuum to remove water and was vacuum dried at 60° C. to obtain yttrium hydroxide. The yttrium oxide was prepared by subjecting the yttrium hydroxide to heat decompositon at 900° C.

The gel-like negative electrode was prepared in the following manner. To 40 wt. % of an aqueous potassium hydroxide solution (containing 3 wt. % of ZnO) were added 3 wt. % of sodium polyacrylate and 1 wt. % of carboxymethylcellulose to form a gel. Then, a given amount of yttrium hydroxide or yttrium oxide powder was gradually added to the resulting gel-like electrolyte under stirring, followed by aging for 2–3 hours. To this gel-like electrolyte was further added the zinc alloy powder in an amount twice the weight of the electrolyte, followed by mixing them. If the surfactant is used, a step of adding it in a given amount, stirring and aging for 2–3 hours was inserted before addition of the inorganic inhibitor.

Evaluation of the resistance to leakage of electrolyte was conducted in the following manner. One hundred alkaline manganese batteries as shown in FIG. 1 were made on an experimental basis and subjected to partial discharge to a depth of 20% of theoretical capacity at a constant current of 0.8A which is the severest condition for an LR6 type battery, and stored for a given period of time at 60° C. The number of batteries in which leakage of the electrolyte occurred was taken as the leakage index (%), by which the leakage resistance was evaluated. When the batteries show a leakage index of 0% after stored for 30 days at 60° C. under the above severe conditions, these batteries are practically usable, but it is desired that the performances relating to reliability of the leakage resistance can be maintained as long as possible.

Example 1

The proper amount of the inorganic inhibitor when the zinc alloy and the inorganic inhibitor are used in combination will be shown.

Table 1 shows the results of the leakage test on batteries in which a zinc alloy containing 0.05 wt. % of bismuth, a zinc alloy containing 0.05 wt. % of bismuth and 0.02 wt. % of lithium, a zinc alloy containing 0.05 wt. % of bismuth and 0.02 wt. % of calcium or a zinc alloy containing 0.05 wt. % of bismuth and 0.02 wt. % of aluminum to which 0.001–1 wt. % of yttrium hydroxide was added was used for negative electrode and which were stored for 30 days at 60° C. In this connection, the zinc alloys used are those which have the highest corrosion resistance among the alloys which do not contain mercury, lead, cadmium, indium and thallium. The yttrium hydroxide used was a yttrium hydroxide powder which was prepared using a sulfate as a starting material, contained 70 wt. % of particles having a particle size of 0.5–8 μ and was 15% in weight loss on heat decomposition at a temperature of up to 900° C.

TABLE 1

Influence of the amount of yttrium hydroxide when zinc alloy and yttrium hydroxide were used in combination

| | Additive elements and compositions (wt %) | | | | Leakage index after storage for 30 days at 60° C. | | | | | | | |
|---|---|---|---|---|---|---|---|---|---|---|---|---|
| | | | | | No inhibitor added (Comparative Example) | Amount of yttrium hydroxide (wt % based on zinc alloy) | | | | | | |
| No. | Bi | Li | Ca | Al | 0 | 0.001 | 0.005 | 0.01 | 0.05 | 0.1 | 0.5 | 1.0 |
| 1 | 0.05 | 0 | 0 | 0 | 54 | 28 | 0 | 0 | 0 | 0 | 0 | 23 |
| 2 | 0.05 | 0.02 | 0 | 0 | 48 | 35 | 0 | 0 | 0 | 0 | 0 | 26 |
| 3 | 0.05 | 0 | 0.02 | 0 | 46 | 31 | 0 | 0 | 0 | 0 | 0 | 24 |
| 4 | 0.05 | 0 | 0 | 0.02 | 44 | 29 | 0 | 0 | 0 | 0 | 0 | 25 |

From Table 1, it can be seen that the zinc alloy excellent in corrosion resistance cannot practically achieve any acceptable resistance to leakage when it is used alone, but the resistance to leakage can be achieved by adding to the alloy a proper amount of the yttrium hydroxide. Good results were obtained when the yttrium hydroxide was added in an amount of 0.005–0.5 wt. % for the respective zinc alloys. When yttrium oxide was used in place of the yttrium hydroxide, the leakage index of the batteries was 0% during storage for 30 days at 60° C. with the amount in the range of 0.005–0.5 wt. % and thus, there was obtained a higher storage stability than when the alloy was used alone.

Example 2

The proper alloy composition when the zinc alloy and the inorganic inhibitor are used in combination will be shown.

Table 2 shows the results of the leakage test on the batteries which were made with fixing the amount of yttrium hydroxide fixed at 0.1 wt. % and changing the amount of bismuth which was alone added to the zinc alloy and stored for 30 days at 60° C.

From Table 2, it can be seen that satisfactory results can be obtained when bismuth is added in an amount of 0.01–0.5 wt. % based on zinc.

TABLE 2

Influence of the alloy composition when zinc alloy and yttrium hydroxide were used in combination

| Additive elements and compositions | | Leakage index (%) after storage for 30 days at 60° C. Amount of yttrium hydroxide |
|---|---|---|
| No. | Bi | 0.1 (wt % based on zinc alloy) |
| 5 | 0.005 | 35 |
| 6 | 0.01 | 0 |
| 7 | 0.5 | 0 |
| 8 | 1.0 | 19 |

Table 3 shows the results of the leakage test on the batteries which were made with the amount of yttrium hydroxide mixed at 0.1 wt. % and changing the amounts of lithium, calcium and aluminum in the zinc alloy containing bismuth, lithium, calcium and aluminum and stored for 60 days at 60° C.

TABLE 3

Influence of the alloy composition when zinc alloy and yttrium hydroxide were used in combination.

| | Additive elements and compositions (wt %) | | | | Leakage index (%) after storage for 60 days at 60° C. Amount of yttrium hydroxide 0.1 (wt % based on zinc alloy) |
|---|---|---|---|---|---|
| No. | Bi | Li | Ca | Al | |
| 9 | 0.05 | 0.001 | 0 | 0 | 26 |
| 10 | 0.05 | 0.005 | 0 | 0 | 0 |
| 11 | 0.05 | 0.01 | 0 | 0 | 0 |
| 12 | 0.05 | 0.2 | 0 | 0 | 0 |
| 13 | 0.05 | 0.5 | 0 | 0 | 20 |
| 14 | 0.05 | 0 | 0.005 | 0 | 0 |
| 15 | 0.05 | 0 | 0.01 | 0 | 0 |
| 16 | 0.05 | 0 | 0.2 | 0 | 0 |
| 17 | 0.05 | 0 | 0 | 0.005 | 0 |
| 18 | 0.05 | 0 | 0 | 0.01 | 0 |
| 19 | 0.05 | 0 | 0 | 0.2 | 0 |
| 20 | 0.05 | 0.002 | 0.002 | 0.001 | 0 |
| 21 | 0.05 | 0.05 | 0.05 | 0.1 | 0 |

From Table 3, it can be seen that good results can be obtained when the amounts of lithium, calcium and aluminum are totally in the range of 0.005–0.2 wt. % based on zinc. The yttrium hydroxide used in Example 2 was the same as used in Example 1. When yttrium oxide was used in place of the yttrium hydroxide, the leakage index of the batteries was 0% during storage for 20 days at 60° C. with the same alloy compositions as above and thus, there was obtained a higher storage stability than when the alloy was used alone.

Example 3

The present invention will be explained regarding limitations of the starting materials in preparation of yttrium hydroxide.

Table 4 shows the results of the leakage test on the batteries which were made using 0.1 wt. % a yttrium hydroxide different in the starting material and stored for 30 days at 60° C.

From Table 4, it can be seen that the batteries made using yttrium hydroxide prepared from chloride or sulfate as a starting material are superior in leakage resistance. It is further seen that even when a nitrate is used as the starting material, the resulting batteries are superior if yttrium hydroxide is prepared in the presence of chloride ions. When yttrium oxide was used in place of the yttrium hydroxide, the batteries showed a leakage index of 0% during storage for 20 days at 60° C. and thus, there was obtained a higher storage stability than when the alloy was used alone.

The yttrium hydroxide different in particle size distribution used in this Example was prepared by using a nitrate as a starting material and by subjecting particles of a large particle size to classification by a wet sedimentation method. When yttrium oxide was used in place of the yttrium hydroxide, the batteries showed a leakage index of 0% during storage for 20 days at 60° C. and thus, there was obtained a higher storage stability than when the alloy was used alone.

TABLE 5

Influence of particle size of yttrium hydroxide when zinc alloy and yttrium hydroxide were used in combination.

| | Additive elements and compositions (wt %) | | | | Leakage index (%) after storage for 30 days at 60° C. Amount of yttrium hydroxide 0.1 (wt % based on zinc alloy) Amount of particles having a particle size of 0.5-8μ (wt %) | | | |
|---|---|---|---|---|---|---|---|---|
| No. | Bi | Li | Ca | Al | 40 | 60 | 70 | 80 |
| 26 | 0.05 | 0 | 0 | 0 | 24 | 0 | 0 | 0 |
| 27 | 0.05 | 0.02 | 0 | 0 | 25 | 0 | 0 | 0 |
| 28 | 0.05 | 0 | 0.02 | 0 | 19 | 0 | 0 | 0 |
| 29 | 0.05 | 0 | 0 | 0.02 | 18 | 0 | 0 | 0 |

TABLE 4

Influence of conditions for preparation of yttrium hydroxide when zinc alloy and yttrium hydroxide were used in combination.

| | Additive elements and compositions (wt %) | | | | Leakage index (%) after storage for 30 days at 60° C. Amount of yttrium hydroxide 0.1 (wt % based on zinc alloy) Starting material and conditions for preparation | | | | |
|---|---|---|---|---|---|---|---|---|---|
| No. | Bi | Li | Ca | Al | Nitrate | Chloride | Sulfate | Sulfate + Chloride ion | Nitrate + Chloride ion |
| 22 | 0.05 | 0 | 0 | 0 | 20 | 0 | 0 | 0 | 0 |
| 23 | 0.05 | 0.02 | 0 | 0 | 18 | 0 | 0 | 0 | 0 |
| 24 | 0.05 | 0 | 0.02 | 0 | 22 | 0 | 0 | 0 | 0 |
| 25 | 0.05 | 0 | 0 | 0.02 | 20 | 0 | 0 | 0 | 0 |

Example 4

Explanation will be made on the limitation of the particle size of yttrium hydroxide.

Table 5 shows the results of the leakage test on the batteries which were made using 0.1 wt. % of a yttrium hydroxide different in the particle size distribution and which were stored for 30 days at 60° C.

It can be seen from Table 5 that superior results are obtained when a yttrium hydroxide powder containing at least 60 wt. % of particles having a particle size in the range of 0.5-8 μ (the remainder of the particles had a particle size of more than 0.5 μ since particles which remained on a filter having a mesh of 0.5 μ at the step of water washing in preparation of yttrium hydroxide) is used. When the yttrium hydroxide powder contained more than 70 wt. % of the particles having the above-mentioned particle size, the batteries sometimes showed no leakage even after elapse of 45 days at 60° C.

Example 5

Explanation will be made on limitation of the weight loss of yttrium hydroxide upon heat decomposition.

Table 6 shows the results of the leakage test on the batteries which were made using 0.1 wt. % of a yttrium hydroxide different in weight loss on heat decomposition at up to 900° C. and which were stored for 30 days at 60° C.

It is seen from Table 6 that superior results can be obtained when yttrium hydroxide having a weight loss on heat decomposition of 8-25 wt. % is used.

The yttrium hydroxide different in weight loss on heat decomposition used in this Example was prepared by using a chloride as a starting material and by subjecting it to neutralizing treatment and changing the vacuum drying time.

TABLE 6

Influence of weight loss of yttrium hydroxide on heat decomposition when zinc alloy and yttrium hydroxide were used in combination.

| | Additive elements and compositions (wt %) | | | | Leakage index (%) after storage for 30 days at 60° C. Amount of yttrium hydroxide 0.1 (wt % based on zinc alloy) Weight loss of yttrium hydroxide on heat decomposition (wt %) | | | | | | |
|---|---|---|---|---|---|---|---|---|---|---|---|
| No. | Bi | Li | Ca | Al | 5 | 8 | 10 | 15 | 20 | 25 | 30 |
| 31 | 0.05 | 0 | 0 | 0 | 6 | 0 | 0 | 0 | 0 | 0 | 9 |
| 32 | 0.05 | 0.02 | 0 | 0 | 7 | 0 | 0 | 0 | 0 | 0 | 8 |
| 33 | 0.05 | 0 | 0.02 | 0 | 6 | 0 | 0 | 0 | 0 | 0 | 7 |

TABLE 6-continued

Influence of weight loss of yttrium hydroxide on heat decomposition when zinc alloy and yttrium hydroxide were used in combination.

| | Additive elements and compositions (wt %) | | | Leakage index (%) after storage for 30 days at 60° C. Amount of yttrium hydroxide 0.1 (wt % based on zinc alloy) Weight loss of yttrium hydroxide on heat decomposition (wt %) | | | | | | |
|---|---|---|---|---|---|---|---|---|---|---|
| No. | Bi | Li | Ca | Al | 5 | 8 | 10 | 15 | 20 | 25 | 30 |
| 34 | 0.05 | 0 | 0 | 0.02 | 8 | 0 | 0 | 0 | 0 | 0 | 8 |

Example 6

The proper amount of an organic inhibitor added in using a zinc alloy, an inorganic inhibitor and the organic inhibitor in combination is shown in this Example.

Table 7 shows the results of the leakage test on the batteries which were made with the amount of yttrium hydroxide fixed at the optimum of 0.1 wt. % for the zinc alloy and changing the amount of the surfactant and stored for 90 days at 60° C.

From the results, it is seen that the proper amount of the organic inhibitor is 0.001–0.1 wt. % based on the zinc alloy.

TABLE 7

Influence of the amount of the surfactant when a zinc alloy, yttrium hydroxide and a surfactant were used in combination.

| | Additive elements and compositions (wt %) | | | | Leakage index (%) after storage for 90 days at 60° C. Amount of yttrium hydroxide 0.1 (wt % based on zinc alloy) Amount of surfactant (wt % based on zinc alloy) | | | | | | |
|---|---|---|---|---|---|---|---|---|---|---|---|
| No. | Bi | Li | Ca | Al | 0.0005 | 0.001 | 0.005 | 0.01 | 0.05 | 0.1 | 0.2 |
| 35 | 0.05 | 0 | 0 | 0 | 23 | 0 | 0 | 0 | 0 | 0 | 26 |
| 36 | 0.05 | 0.02 | 0 | 0 | 37 | 0 | 0 | 0 | 0 | 0 | 19 |
| 37 | 0.05 | 0 | 0.02 | 0 | 18 | 0 | 0 | 0 | 0 | 0 | 39 |
| 38 | 0.05 | 0 | 0 | 0.02 | 22 | 0 | 0 | 0 | 0 | 0 | 27 |

The surfactant used in Example 6 had the following formula:

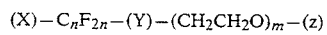

X: —F
Y: $C_2H_4$-O-$CH_2CH(OH)$—$CH_2$-O
Z: $CH_3$,
n: 9, m: 45

When a surfactant having the following formula is used, the same or higher effect can be obtained.

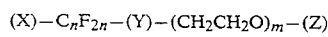

X: H or F
Y: $C_2H_4$-O-$CH_2CH(OH)$—$CH_2$—O
Z: $CH_3$, $PO_3W_2$ or $SO_3W$ {W: alkali metal}
n: 4–14 m: 20–100

Phosphate type surfactants among the above surfactants may be mixtures of primary and secondary phosphates.

Yttrium hydroxide used in Example 6 was the same as used in Example 1. When the suitable yttrium hydroxide or yttrium oxide shown in Examples 1, 2, 3, 4 and 5 is used, there can be obtained batteries having a sufficient storage stability. Furthermore, the same thing can also be applied to the alloy compositions.

As explained above, according to the present invention, unexpectedly higher synergistic effects can be obtained in zinc-alkaline batteries by adding to the alkaline electrolyte a zinc alloy having a proper composition and yttrium hydroxide or yttrium oxide which is imparted with proper properties by employing a proper process for the preparation thereof and increase of the internal pressure of the batteries caused by corrosion of zinc can be inhibited without using mercury, lead and indium and thus, the leakage resistance of the batteries can be improved. Furthermore, by adding an organic inhibitor having a proper structural formula in a proper amount, there can be provided non-pollution zinc-alkaline batteries superior in storage stability.

What is claimed is:

1. A zinc-alkaline battery comprising a zinc alloy as an active ingredient and an alkaline electrolyte comprising 0.005 to 0.5 wt. % of yttrium hydroxide based on the zinc alloy;

said zinc alloy containing at least one element selected from the group consisting of bismuth, lithium, calcium and aluminum, and said zinc alloy being free from mercury, lead, cadmium, indium and thallium; and said yttrium hydroxide being prepared by subjecting a yttrium salt as a starting material to a neutralizing treatment in an aqueous solution thereof.

2. A battery according to claim 1, wherein the zinc alloy contains 0.01–0.5 wt. % of bismuth and is used as a negative electrode active material.

3. A battery according to claim 1, wherein the zinc alloy is used as a negative electrode active material and constrains 0.01–0.5 wt. % of bismuth and 0.005–0.2 wt. % of at least one element selected from the group consisting of lithium, calcium and aluminum.

4. A battery according to claim 1, wherein the yttrium salt is yttrium chloride.

5. A battery according to claim 1, wherein the yttrium hydroxide is prepared by subjecting a yttrium salt selected from the group consisting of yttrium nitrate and yttrium sulfate to the neutralizing treatment in an aqueous solution thereof containing chloride ion.

6. A battery according to claim 1, wherein the yttrium hydroxide contains particles having a particle size of 0.5–8 μ in an amount of at least 60 wt. % based on the total amount of the yttrium hydroxide.

7. A battery according to claim 1, wherein the yttrium hydroxide shows a weight loss of 8–25 wt. % on heat decomposition at up to 900° C.

8. A zinc-alkaline battery comprising a zinc alloy as an active ingredient and an alkaline electrolyte comprising 0.005–0.5 wt. % of yttrium oxide based on the zinc alloy;

said zinc alloy containing at least one element selected from the group consisting of bismuth, lithium, calcium and aluminum, and said zinc alloy being free from mercury, lead cadmium, indium and thallium.

9. A battery according to claim 8, wherein the zinc alloy contains 0.01–0.5 wt. % of bismuth and is used as a negative electrode active material.

10. A battery according to claim 8, wherein the zinc alloy is used as a negative electrode active material and contains 0.01–0.5 wt. % of bismuth and 0.005–0.2 wt. % of at least one element selected from the group consisting of lithium, and aluminum.

11. A battery according to claim 8, wherein the yttrium oxide is prepared by heat decomposition of yttrium hydroxide prepared by subjecting a yttrium salt as a starting material to a neutralizing treatment in an aqueous solution thereof.

12. A battery according to claim 8, wherein the yttrium oxide contains particles having a particle size of 0.5–8 $\mu$ in an amount of at least 60 wt. % based on the total amount of the yttrium oxide.

13. A zinc-alkaline battery comprising a zinc alloy as an active ingredient and an alkaline electrolyte;

said zinc alloy containing at least one element selected from the group consisting of bismuth, lithium, calcium and aluminum, and said zinc alloy being free from mercury, lead, cadmium, indium and thallium; and said alkaline electrolyte comprising 0.005–0.5 wt. % of a member selected from the group consisting of yttrium hydroxide and yttrium oxide based on the zinc alloy and 0.001–0.1 wt. % of a surfactant having a polyethylene oxide group in its hydrophilic group and a perfluoroalkyl group in its oleophilic group.

14. A battery according to claim 13, wherein the zinc alloy contains 0.01–0.5 wt. % of bismuth and is used as a negative electrode active material.

15. A battery according to claim 13, wherein the zinc alloy is used as a negative electrode active material and contains 0.01–0.5 wt. % of bismuth and 0.005–0.2 wt. % of at least one element selected from the group consisting of lithium, calcium and aluminum.

16. A battery according to claim 13, wherein the yttrium hydroxide is prepared by subjecting yttrium chloride as starting material to a neutralizing treatment in an aqueous solution thereof.

17. A battery according to claim 13, wherein the yttrium hydroxide is prepared by subjecting yttrium salt selected from the group consisting of yttrium nitrate and yttrium sulfate as a starting material to a neutralizing treatment in an aqueous solution thereof containing chlorine ions.

18. A battery according to claim 13, wherein the yttrium hydroxide or yttrium oxide contains particles having a particle size of 0.5–8 $\mu$ in an amount of at least 60 wt. % based on the total amount of the yttrium hydroxide or yttrium oxide.

19. A battery according to claim 13, wherein the yttrium hydroxide shows a weight loss of 8–25 wt. % on heat decomposition at up to 900° C.

20. A battery according to claim 13, wherein the yttrium oxide is prepared by heat decomposition of yttrium hydroxide prepared by subjecting a yttrium salt as a starting material to a neutralizing treatment in an aqueous solution thereof.

* * * * *